(12) United States Patent
Zhao et al.

(10) Patent No.: US 11,412,351 B2
(45) Date of Patent: Aug. 9, 2022

(54) METHODS AND DEVICES FOR MOBILITY MANAGEMENT

(71) Applicant: Telefonaktiebolaget LM Ericsson (publ), Stockholm (SE)

(72) Inventors: Zhiqiang Zhao, Shanghai (CN); Zhiwei Qu, Shanghai (CN); Xiaoming Li, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/762,891

(22) PCT Filed: Nov. 10, 2017

(86) PCT No.: PCT/CN2017/110329
§ 371 (c)(1),
(2) Date: May 8, 2020

(87) PCT Pub. No.: WO2019/090652
PCT Pub. Date: May 16, 2019

(65) Prior Publication Data
US 2021/0176598 A1    Jun. 10, 2021

(51) Int. Cl.
*H04W 4/02* (2018.01)
*H04W 8/02* (2009.01)

(52) U.S. Cl.
CPC ............ *H04W 4/027* (2013.01); *H04W 8/02* (2013.01)

(58) Field of Classification Search
CPC ....... H04W 4/027; H04W 4/029; H04W 8/02; H04W 8/08; H04W 8/24; H04W 60/00; H04W 36/00
See application file for complete search history.

(56) References Cited

U.S. PATENT DOCUMENTS

2010/0075698 A1    3/2010  Rune et al.
2011/0098051 A1    4/2011  Kamalaraj et al.
(Continued)

FOREIGN PATENT DOCUMENTS

| CN | 102045834 A | 5/2011 |
| CN | 102457936 A | 5/2012 |
| WO | 2012105878 A1 | 8/2012 |

OTHER PUBLICATIONS

International Search Report and the Written Opinion of the International Searching Authority, issued in corresponding International Application No. PCT/CN2017/110329, dated Jul. 20, 2018, 9 pages.
(Continued)

*Primary Examiner* — Khawar Iqbal
(74) *Attorney, Agent, or Firm* — Christopher & Weisberg, P.A.

(57) ABSTRACT

A method implemented by a network device for mobility management in a wireless communication network is provided. The network device is communicatively connected to at least a user equipment in the wireless communication network. The method comprises determining whether the user equipment is in a fast-moving state upon receipt of a tracking area update request from the user equipment. The method further comprises: in response to the user equipment being in the fast-moving state, configuring a tracking area identity list associated with the user equipment to include only a current tracking area identity associated with the user equipment, and paging the user equipment using the tracking area identity list. Accordingly, a network device for mobility management in a wireless communication network is also provided.

7 Claims, 5 Drawing Sheets

(56) References Cited

U.S. PATENT DOCUMENTS

| | | | |
|---|---|---|---|
| 2011/0190010 A1* | 8/2011 | Cho | H04W 60/04 |
| | | | 455/458 |
| 2014/0024407 A1* | 1/2014 | Yin | H04W 68/04 |
| | | | 455/515 |
| 2016/0255564 A1* | 9/2016 | Yang | H04W 36/32 |
| | | | 455/436 |
| 2017/0201925 A1* | 7/2017 | Chong | H04W 60/04 |
| 2017/0311369 A1* | 10/2017 | Chiba | H04W 76/15 |
| 2018/0110028 A1* | 4/2018 | Guo | H04W 64/006 |
| 2019/0028943 A1* | 1/2019 | Wang | H04W 8/065 |
| 2019/0053192 A1* | 2/2019 | Rune | H04W 8/26 |
| 2019/0261314 A1* | 8/2019 | Byun | H04W 8/10 |
| 2020/0037386 A1* | 1/2020 | Park | H04W 80/02 |
| 2020/0059884 A1* | 2/2020 | Chen | H04W 48/08 |

OTHER PUBLICATIONS

Siemens "Tracking Area concept discussions in permanent consideration of Pool Area decisions in SA2 and answers given by RAN2" 3GPP TSG RAN WG3 Meeting #55, R3-070272, St. Louis, Missouri, USA, Feb. 12-16, 2007, 4 pages.

\* cited by examiner

METHODS AND DEVICES FOR MOBILITY MANAGEMENT

CROSS REFERENCE TO RELATED APPLICATION(S)

This application is a 35 U.S.C. § 371 National Phase Entry Application from 371 of PCT/CN2017/110329, filed Nov. 10, 2017, designating the United States, the disclosure of which is incorporated herein by reference in its entirety.

TECHNICAL FIELD

The present disclosure generally relates to wireless communication networks, and more specifically to methods and devices for mobility management.

BACKGROUND

In the Long Term Evolution (LTE), which is the next-generation cellular communication standard discussed in the Third Generation Partnership Project (3GPP), when a user equipment (UE) registers with a network, a mobility management entity (MME) serving tracking areas (TAs) with which the UE is registered allocates a list of tracking area identities (TAIs) to the UE, and pages the idle-mode UE in an area which is limited by the TAI list. A dynamic TAI list includes TAIs recently accessed by the UE.

Since radio resources are expensive and limited, paging the UE in an efficient way becomes increasingly essential. Therefore, there is a tradeoff between saving the radio resources and quickly reaching the UE, because the MME usually expands the paging area gradually in adaptive paging.

For instance, for some non-time-critical services such as packet switched services, the paging area is expanded in the following order: 1) the last visited eNB, which is the minimum paging area for the UE; 2) a list of the last visited eNBs; 3) the current TAI; and 4) the TAI list generally including the current TAI and the last visited TAIs. In other words, if the UE cannot be reached by paging in the last visited eNB, the MME will perform the paging process in the last-visited-eNB list; if the UE still cannot be reached, the paging process will be performed in the current TA; and the like. Moreover, for some time-critical services such as a voice call service or a high priority service, the MME generally pages the UE using the TAI list, which is the maximum paging area, so that the UE can be reached more quickly.

With the development of transportation, modern users of the UEs often travel by high-speed vehicles, e.g, 250-350 kilometers per hour (km/h) or more. This may result in more paging failures and slower paging responses than in normal-speed vehicles.

In view of this, if the UE is moving fast, e.g., on a high-speed railway, then the last visited eNB or eNB list, the last visited TAI or other previously visited TAIs can hardly be used for paging the UE successfully since the UE which is fast-moving straight ahead will probably not return to these areas. The paging process which often lasts several seconds would lead to a waste of the radio resources when the UE could not be reached in the above visited areas. Especially, as described above with respect to the time-critical services, the MME usually pages the UE directly using the largest paging area, i.e., the whole TAI list including all of the visited TAIs, which may induce more wastes.

SUMMARY

It is an object of the present disclosure to improve a paging efficiency for a fast-moving UE, thereby effectively utilizing the radio resources.

According to a first aspect of the present disclosure, a method implemented by a network device for mobility management in a wireless communication network is provided. The network device may be communicatively connected to at least a user equipment in the wireless communication network. The method may comprise determining whether the user equipment is in a fast-moving state upon receipt of a tracking area update request from the user equipment. The method may further comprise: in response to the user equipment being in the fast-moving state, configuring a tracking area identity list associated with the user equipment to include only a current tracking area identity associated with the user equipment, and paging the user equipment using the tracking area identity list.

According to a second aspect of the present disclosure, a method implemented by a user equipment for mobility management in a wireless communication network is provided. The user equipment may be communicatively connected to at least a network device in the wireless communication network. The method may comprise transmitting a tracking area update request to the network device; receiving a tracking area identity list that is configured to include only a current tracking area identity associated with the user equipment, in an accept message from the network device; and receiving a paging message transmitted based on the tracking area identity list.

According to a third aspect of the present disclosure, a network device for mobility management in a wireless communication network is provided. The network device may be communicatively connected to at least a user equipment in the wireless communication network. The network device may comprise a processor and a memory communicatively coupled to the processor. The memory may be adapted to store instructions which, when executed by the processor, may cause the network device to: determine whether the user equipment is in a fast-moving state upon receipt of a tracking area update request from the user equipment; in response to the user equipment being in the fast-moving state, configure a tracking area identity list associated with the user equipment to include only a current tracking area identity associated with the user equipment, and page the user equipment using the tracking area identity list.

According to a fourth aspect of the present disclosure, a user equipment for mobility management in a wireless communication network is provided. The user equipment may be communicatively connected to at least a network device in the wireless communication network. The user equipment may comprise a processor and a memory communicatively coupled to the processor. The memory may be adapted to store instructions which, when executed by the processor, may cause the user equipment to: transmit a tracking area update request to the network device; receive a tracking area identity list that is configured to include only a current tracking area identity associated with the user equipment, in an accept message from the network device; and receive a paging message transmitted based on the tracking area identity list.

According to a fifth aspect of the present disclosure, a wireless communication system for mobility management is provided. The wireless communication system may comprise at least a network device and a user equipment communicatively connected to each other. The network device may comprise a first processor and a first memory communicatively coupled to the first processor. The first memory may be adapted to store instructions which, when executed by the first processor, may cause the network device to: determine whether the user equipment is in a fast-moving state upon receipt of a tracking area update request from the user equipment; in response to the user equipment being in the fast-moving state, configure a tracking area identity list associated with the user equipment to include only a current tracking area identity associated with the user equipment, and page the user equipment using the tracking area identity list. The user equipment may comprise a second processor and a second memory communicatively coupled to the second processor. The second memory may be adapted to store instructions which, when executed by the second processor, may cause the user equipment to: transmit the tracking area update request to the network device; receive the tracking area identity list in an accept message from the network device; and receive a paging message transmitted based on the tracking area identity list.

According to a sixth aspect of the present disclosure, a non-transitory computer readable medium having a computer program stored thereon is provided. When the computer program is executed by a set of one or more processors of a network device for mobility management, the computer program may cause the network device to perform operations of the method according to the above first aspect.

According to a seventh aspect of the present disclosure, a non-transitory computer readable medium having a computer program stored thereon is provided. When the computer program is executed by a set of one or more processors of a user equipment, the computer program may cause the user equipment to perform operations of the method according to the above second aspect.

On one hand, the present disclosure can increase a paging success rate and decrease a paging response time at least for the fast-moving UEs in the non-time-critical services by removing the paging in the eNB and eNB list. On the other hand, the present disclosure can minimize the paging area to the single current TA at least for the fast-moving UEs in the time-critical services.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
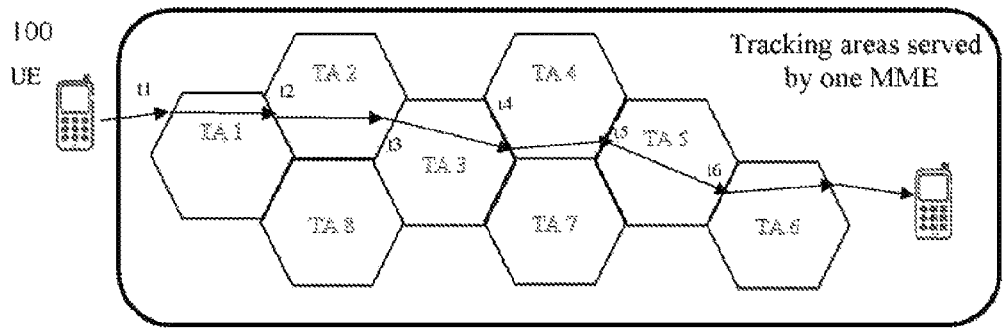
FIG. 1 is a schematic diagram illustrating a UE moving across a number of TAs served by one MME.

The following detailed description describes methods and apparatuses for mobility management in a wireless communication network. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

FIG. 1 is a schematic diagram illustrating a scenario in which a UE 100 is moving across several tracking areas served by one and the same MME (not shown). As exemplarily shown in FIG. 1, the UE 100 consecutively passes through TA1, TA2, TA3, TA4, TA5 and TA6, with none of which the UE 100 was previously registered. Once the UE 100 enters a new TA with which it is not registered while leaving a previous TA, the UE 100 transmits a tracking area update (TAU) request to the MME, and the MME records a timestamp when receiving the TAU request. As an example, the UE 100 transmits a TAU request to the MME when entering TA1, and the MME records a timestamp t1 upon receipt of the TAU request; and then the UE 100 transmits another TAU request when entering TA2, and the MME records a timestamp t2, which is the entering time $t_{in}$ for TA2 and the leaving time $t_{out}$ for TA1, upon receipt of this TAU request; and the like. The timestamps t1-t6 may be employed herein to determine whether the UE is fast moving, which will be discussed below in detail.

When the UE 100 is moving fast, e.g., on a high-speed railway, it is very difficult for the MME to reach the UE 100 successfully by performing the paging process using the last visited eNB or eNB list, the last visited TAI or other previously visited TAIs since the UE 100 is moving rapidly straight ahead and will not go back to these areas. The paging process which often lasts several seconds would lead to a waste of the radio resources when the UE could not be reached in the previously visited areas. For the time-critical services, the MME usually pages the UE directly using the largest paging area, i.e., the whole TAI list, which may induce more wastes.

Figure 2:
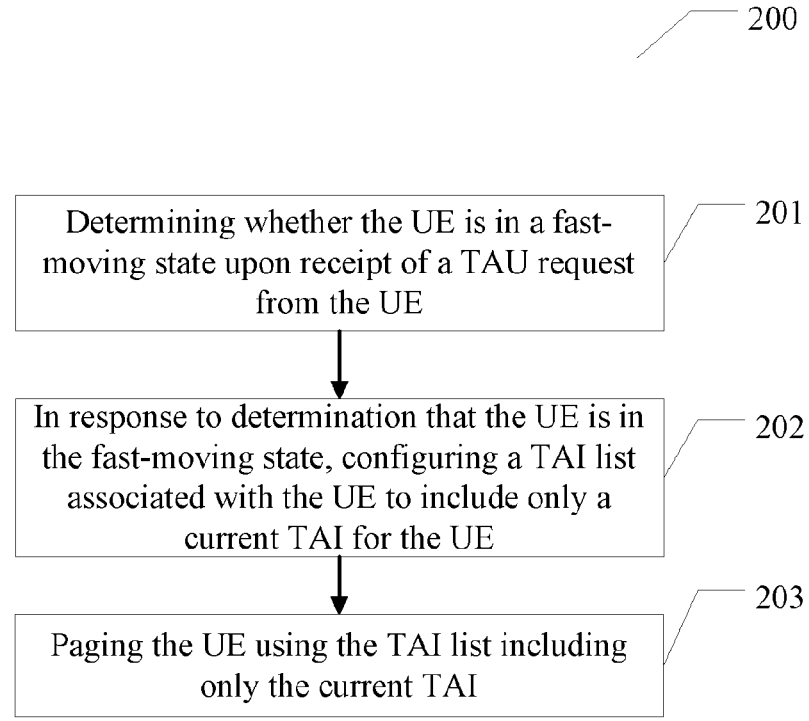
FIG. 2 is a flow chart illustrating a method implemented on a network device according to some embodiments of the present disclosure.

FIG. 2 is a flow chart illustrating a method 200 implemented on a network device for mobility management according to some embodiments of the present disclosure. For simplicity and clarity, the network device may be an MME communicating with UEs by way of example, but it is not limited to the MME. The operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the method begins with the MME determining whether the UE, e.g., the UE 100 as shown in FIG. 1, is in a fast-moving state upon receipt of a TAU request from the UE (block 201). In response to determination that the UE is in the fast-moving state, the MME may configure a TAI list associated with the UE to include only a current TAI for the UE (block 202), and page the UE using this TAI list (block 203). In other words, if the MME discovers that the UE is fast moving, the MME constructs the TAI list only using the current TAI. When the MME receives a downlink data notification from a serving gateway (S-GW), the MME may page the UE using the TAI list, i.e., directly within the TA indicated by the current TAI for the UE. As an example, when the UE 100 enters TA4 as shown in FIG. 1 and the MME finds that the UE 100 is fast moving, the MME will page the UE 100 directly within TA4, without using the last visited eNB or eNB list or any of the TAs identified by the previously visited TAIs, e.g., TA1-TA3 in FIG. 1. This will save substantial radio resources since paging the UE in other areas than the current TA of the UE is of no use as the UE is moving fast forward.

If it is determined that the UE is not in the fast-moving state, the MME may configure the TAI list in the conventional way, e.g., in the order of the last visited eNB, the last visited eNB list, the current TAI and the TAI list for the non-time-critical services; and using the whole TAI list for the time-critical services.

Turning back to FIG. 1, for each of the TAs, it may be determined whether the UE is in the fast-moving state based on a duration $t_{duration}$ in which the UE stays in the TA and a duration threshold $t_{threshold}$. The duration $t_{duration}$ may be computed based on the timestamps $t_{in}$ and $t_{out}$ recorded when the UE enters and leaves the TA respectively, e.g., in one embodiment, based on a difference between the timestamps $t_{out}$ and $t_{in}$ for the TA. As an example, $t_{duration}$ in which the UE stays in TA1 may be computed as $t_2-t_1$. The duration threshold $t_{threshold}$ may be predetermined, e.g., predefined by an operator based on a size of the TA and/or other network deployments. As an example, $t_{threshold}$ may be 10 seconds, 15 seconds, 20 seconds, etc. The determination of whether the UE is in the fast-moving state will be described below in more detail with respect to FIG. 3.

Figure 3:
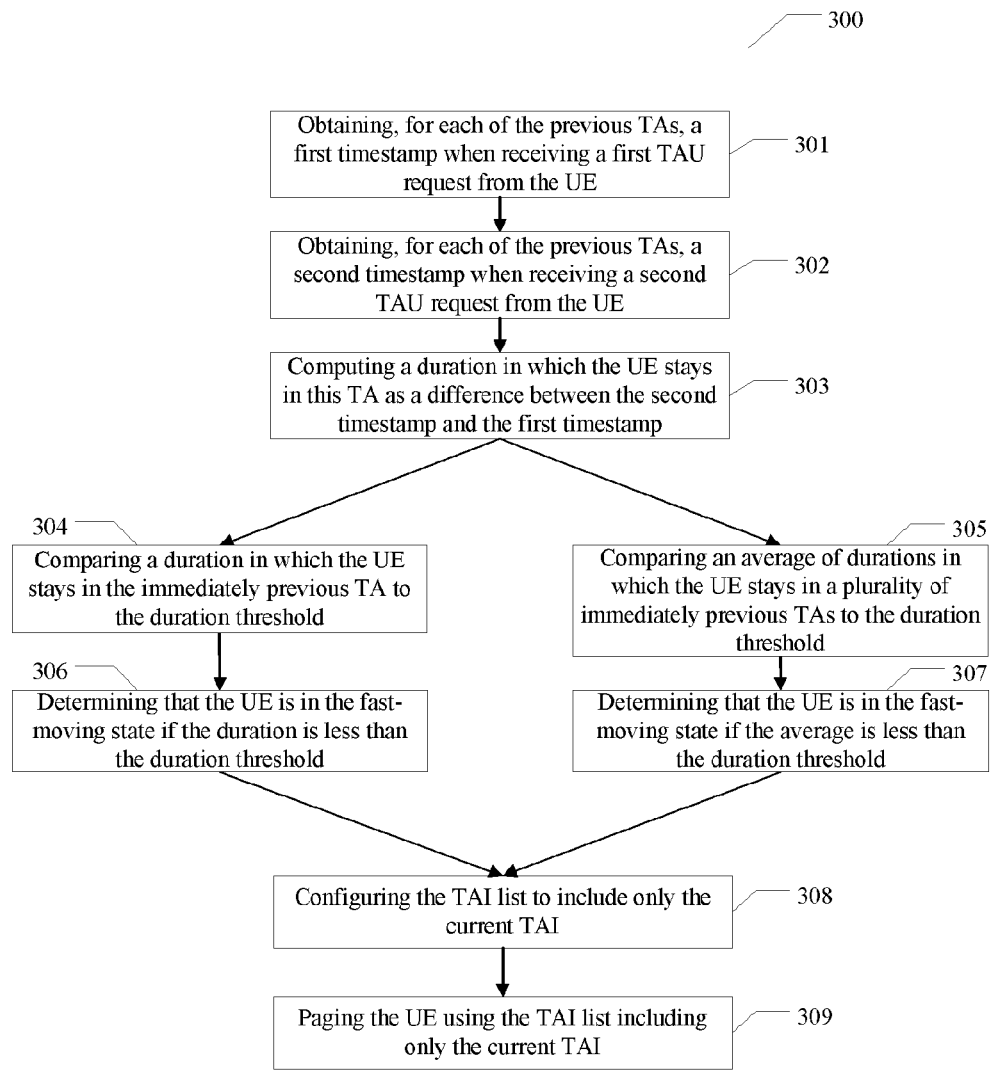
FIG. 3 is a more specific flow chart illustrating a method implemented on a network device according to some embodiments of the present disclosure.

FIG. 3 is a more specific flow chart illustrating a method implemented on a network device for mobility management according to some embodiments of the present disclosure. For simplicity and clarity, the network device may be an MME communicating with UEs by way of example, but it is not limited to the MME.

In one embodiment, for each of the previous TAs, the MME obtains a first timestamp when receiving a first TAU request from the UE (block 301), and obtains a second timestamp when receiving a second TAU request from the UE (block 302). For example, as described above with respect to FIG. 1, in the duration $t_{duration1}$ in which the UE stays in TA1, the MME records a timestamp t1 when receiving a first TAU request from the UE as the UE enters TA1, and the MME records a timestamp t2 when receiving a second TAU request from the UE as the UE leaves TA1; likewise, in the duration $t_{duration2}$ in which the UE stays in TA2, the UE records timestamps t2 and t3 respectively; and the like. In one embodiment, for each of the previous TAs, the MME may compute the duration in which the UE stays in this TA as a difference between the second timestamp and the first timestamp (block 303).

The MME may compare a time duration associated with the UE to the duration threshold and determine that the UE is in the fast-moving state if the time duration is less than the duration threshold. In one embodiment, the MME may compare a duration in which the UE stays in the immediately previous TA to the duration threshold (block 304) and determine that the UE is in the fast-moving state if the duration is less than the duration threshold (block 306). As an example, when the UE 100 enters TA3, the MME may compare the duration $t_{duration2}$ in which the UE stays in TA2 to $t_{threshold}$. In another embodiment, in order to further improve an accuracy, the MME may compare an average duration of durations in which the UE stays in a plurality of immediately previous TAs to the duration threshold (block 305) and determine that the UE is in the fast-moving state if the average duration is less than the duration threshold (block 307). As an example, when the UE 100 enters TA4, the MME may compare an average of $t_{duration1}$, $t_{duration2}$ and $t_{duration3}$ to $t_{threshold}$.

The following Table I shows some situations of construction of the TAI list.

TABLE I

| Current TA | TA2 | TA3 | TA4 | TA5 | TA6 |
|---|---|---|---|---|---|
| Immediately previous TA | TA1 | TA2 | TA3 | TA4 | TA5 |
| $t_{in}$ for the immediately previous TA | t1 | t2 | t3 | t4 | t5 |
| $t_{out}$ for the immediately previous TA | t2 | t3 | t4 | t5 | t6 |
| $t_{duration}$ for the immediately previous TA | t2-t1 | t3-t2 | t4-t3 | t5-t4 | t6-t5 |
| TAI list | [TA2, TA1] | [TA3, TA2, TA1] | [TA4] | [TA5] | [TA6, TA5, TA4, TA3, TA2, TA1] |

As an example, when the UE enters TA3, the MME compares the time duration (t3−t2) or (t3−t1)/2 to the predetermined $t_{threshold}$ and derives the result that the UE is not in the fast-moving state, and the TAI list is then configured to include both the current TA (i.e., TA3) and the previous TAs (i.e., TA2 and TA1). When the UE enters TA4/TA5, the MME compares the time duration (t4−t3) or (t4−t1)/3/(t5−t4) or (t5−t1)/4 to $t_{threshold}$ and determines that the UE is in the fast-moving state, and then the TAI list is configured by the MME to include only the current TAI (block 308). When the UE continues to enter TA6, if the MME discovers that the UE is not in the fast-moving state again by comparing the associated time duration to $t_{threshold}$, then the MME turns to configure the TAI list in the conventional way.

If the MME determines that the UE is in the fast-moving state, then after configuration of the TAI list, the MME pages the UE using the TAI list including only the current TAI (block 309). As described above, the radio resources are saved by eliminating the paging made using the eNB/eNB list or the whole TAI list including all of the visited TAIs.

Figure 4:
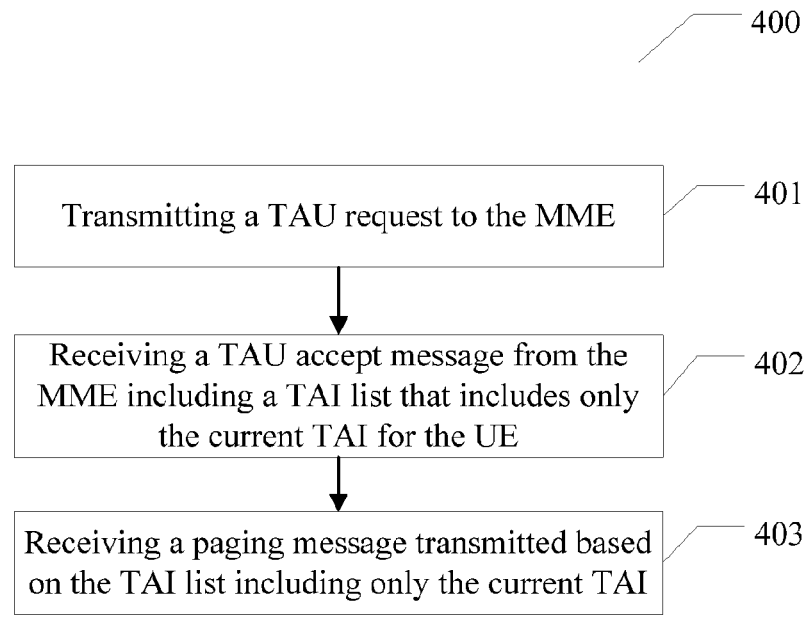
FIG. 4 is a flow chart illustrating a method implemented on a UE according to some embodiments of the present disclosure.

FIG. 4 is a flow chart illustrating a method 400 implemented on a UE according to some embodiments of the present disclosure. In one embodiment, the operations of the flow chart may be performed by the UE 100 as shown in FIG. 1 which communicates with a network device for mobility management. The network device may be but not limited to an MME.

In one embodiment, the method begins with the UE 100 transmitting a TAU request to the MME (block 401). As described above, the UE 100 transmits the TAU request to the MME when the UE 100 detects that it enters a new TA with which it is not registered. The UE 100 may later receive a TAU accept message from the MME including a TAI list that includes only the current TAI for the UE 100 (block 402). In the paging requested by the MME to an application server based on the TAI list including only the current TAI, the UE 100 may receive a paging message from the application server (block 403).

As an example, the TAI list received in the TAU accept message may be configured in response to determination that the UE 100 is in a fast-moving state. As a further example, the determination is made by the MME based on a comparison of an average of durations in which the UE 100 stays in each of a plurality of immediately previous TAs to the duration threshold. As a still further example, the duration for each of the TAs is computed by the MME based on timestamps corresponding to the TAU requests transmitted by the UE 100, e.g., timestamps corresponding to receipt of the TAU requests transmitted when the UE 100 enters and leaves this TA.

Figure 5:
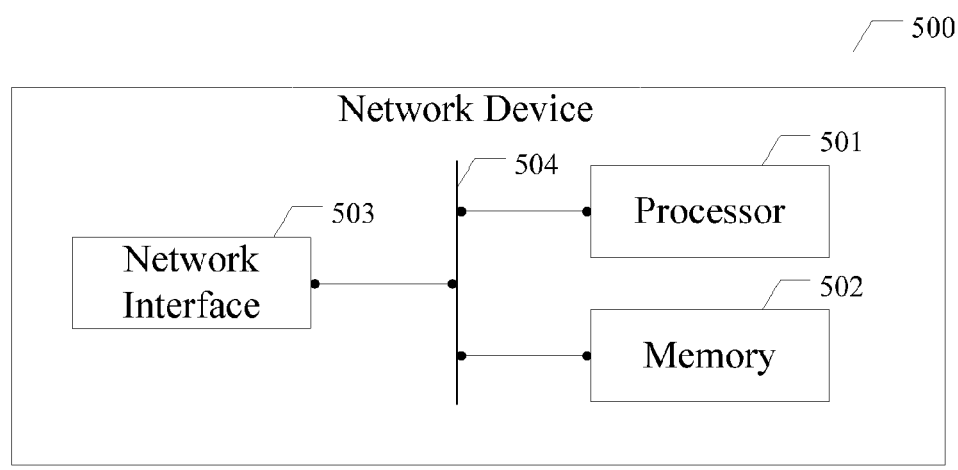
FIG. 5 is a block diagram illustrating a network device according to some embodiments of the present disclosure.

FIG. 5 is a block diagram illustrating a network device 500 for mobility management according to some embodiments of the present disclosure. As an example, the network device 500 may be an MME communicating with UEs, but it is not limited to the MME. It should be appreciated that the network device 500 may be implemented using components other than those illustrated in FIG. 5.

With reference to FIG. 5, the network device 500 may comprise at least a processor 501, a memory 502, a network interface 503 and a communication medium 504. The processor 501, the memory 502 and the network interface 503 are communicatively coupled to each other via the communication medium 504.

The processor 501 includes one or more processing units. A processing unit may be a physical device or article of manufacture comprising one or more integrated circuits that read data and instructions from computer readable media, such as the memory 502, and selectively execute the instructions. In various embodiments, the processor 501 is implemented in various ways. As an example, the processor 501 may be implemented as one or more processing cores. As another example, the processor 501 may comprise one or more separate microprocessors. In yet another example, the processor 501 may comprise an application-specific integrated circuit (ASIC) that provides specific functionality. In yet another example, the processor 501 provides specific functionality by using an ASIC and by executing computer-executable instructions.

The memory 502 includes one or more computer-usable or computer-readable storage medium capable of storing data and/or computer-executable instructions. It should be appreciated that the storage medium is preferably a non-transitory storage medium.

The network interface 503 may be a device or article of manufacture that enables the network device 500 to send data to or receive data from the UEs. In different embodiments, the network interface 503 is implemented in different ways. As an example, the network interface 503 may be implemented as an Ethernet interface, a token-ring network interface, a fiber optic network interface, a wireless network interface (e.g., Wi-Fi, WiMax, etc.), or another type of network interface.

The communication medium 504 facilitates communication among the processor 501, the memory 502 and the network interface 503. The communication medium 504 may be implemented in various ways. For example, the communication medium 504 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 5, the instructions stored in the memory 502 may include those that, when executed by the processor 501, cause the network device 500 to implement the methods described with respect to FIGS. 2 and 3.

Figure 6:
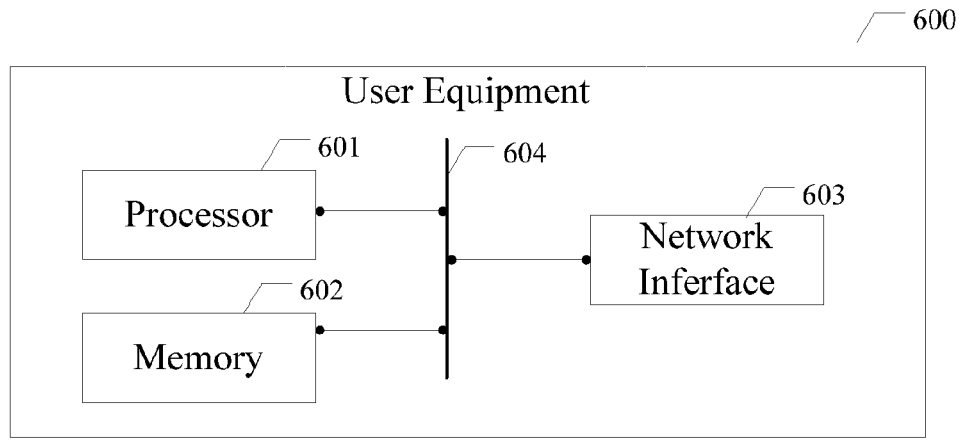
FIG. 6 is a block diagram illustrating a UE according to some embodiments of the present disclosure.

FIG. 6 is a block diagram illustrating a UE 600 according to some embodiments of the present disclosure. As an example, the UE 600 may act as the UE 100 as shown in FIG. 1. It should be appreciated that the network device 600 may be implemented using components other than those illustrated in FIG. 6.

With reference to FIG. 6, the network device 600 may comprise at least a processor 601, a memory 602, a network interface 603 and a communication medium 604. The processor 601, the memory 602 and the network interface 603 are communicatively coupled to each other via the communication medium 604.

The processor 601, the memory 602, the network interface 603 and the communication medium 604 are structurally and functionally similar to the processor 501, the memory 502, the network interface 503 and the communication medium 504 respectively, and will not be described herein in detail.

In the example of FIG. 6, the instructions stored in the memory 602 may include those that, when executed by the processor 601, cause the network device 600 to implement the method described with respect to FIG. 4.

Figure 7:
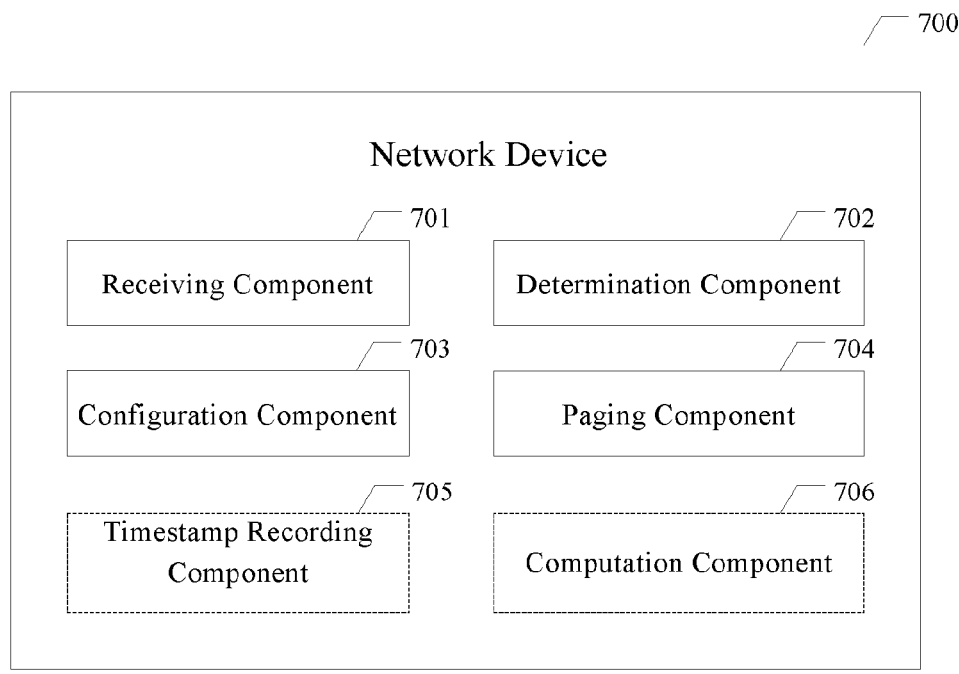
FIG. 7 is a block diagram illustrating another network device according to some embodiments of the present disclosure.

FIG. 7 is a block diagram illustrating a network device 700 for mobility management according to some embodiments of the present disclosure. As an example, the network device 700 may be an MME communicating with UEs, but it is not limited to the MME. It should be appreciated that the network device 700 may be implemented using components other than those illustrated in FIG. 7.

With reference to FIG. 7, the network device 700 may comprise at least a receiving component 701, a determination component 702, a configuration component 703 and a paging component 704. The receiving component 701 may be adapted to receive a TAU request from a UE. The determination component 702 may be adapted to determine whether the UE is in a fast-moving state when the TAU request is received by the receiving component 701. The configuration component 703 may be adapted to configure a TAI list associated with the UE to include only a current TAI associated with the UE, in response to the determination component 702 determining that the UE is in the fast-moving state. The paging component 704 may be adapted to page the UE using the TAI list configured to include only the current TAI, in response to the determination component 702 determining that the UE is in the fast-moving state.

In one embodiment, the determination component 702 may be further adapted to compare a time duration value associated with the UE to a predetermined duration threshold and to determine that the UE is in the fast-moving state if the time duration value is less than the duration threshold. As an example, the determination component 702 may compare a duration in which the UE stays in the immediately previous TA to the duration threshold and determine that the UE is in the fast-moving state if the duration is less than the duration threshold. As an another example, the MME may compare an average duration of durations in which the UE stays in a plurality of immediately previous TAs and determine that the UE is in the fast-moving state if the average duration is less than the duration threshold.

In one embodiment, the network device 700 may further comprise a timestamp recording component 705 and a computation component 706. The timestamp recording component 705 may be adapted, for each of the previous TAs that the UE entered, to record a first timestamp when a first TAU request is received by the receiving component 701 from the UE and to record a second timestamp when a second TAU request is received by the receiving component 701 from the UE. The computation component 706 may be adapted to compute the duration in which the UE stays in each of the previous TAs as a difference between the second timestamp for this previous TA and the first timestamp for this previous TA.

The components 701-706 are illustrated as separate components in FIG. 7. However, this is merely to indicate that the functionality is separated. The components may be provided as separate elements. However, other arrangements are possible, e.g., some of them may be combined as one unit. Any combination of the components may be implemented in any combination of software, hardware, and/or firmware in any suitable location. For example, there may be more controllers configured separately, or just one controller for all of the components.

The components may constitute machine-executable instructions embodied within a machine, e.g., readable medium, which when executed by a machine will cause the machine to perform the operations described. Besides, any of the components may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some components may be omitted altogether. Functionality and cooperation of these components are correspondingly described in more detail with reference to FIGS. 2 and 3.

Figure 8:
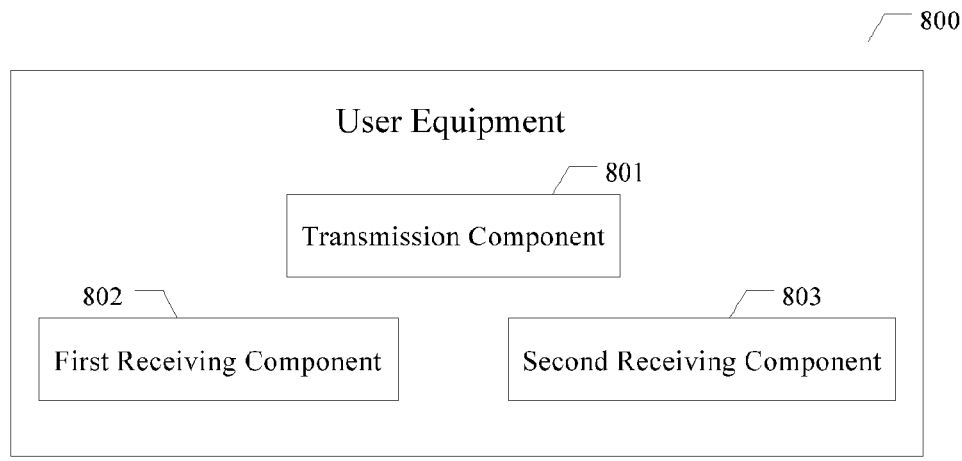
FIG. 8 is a block diagram illustrating another UE according to some embodiments of the present disclosure.

FIG. 8 is a block diagram illustrating a UE 800 according to some embodiments of the present disclosure. As an example, the UE 800 may act as the UE 100 as shown in FIG. 1. It should be appreciated that the UE 800 may be implemented using components other than those illustrated in FIG. 8.

With reference to FIG. 8, the UE 800 may comprise at least a transmission component 801, a first receiving component 802 and a second receiving component 803. The transmission component 801 may be adapted to transmit a TAU update request to a network device, e.g., the MME. The first receiving component 802 may be adapted to receive a TAI list that is configured to include only a current TAI associated with the UE 800, in a TAU accept message from the network device. The second receiving component 803 may be adapted to receive a paging message transmitted based on the TAI list configured to include only the current TAI.

As an example, the TAI list received in the TAU accept message may be configured in response to determination that the UE 800 is in a fast-moving state. As a further example, the determination is made based on a comparison of an average of durations in which the UE 800 stays in each of a plurality of immediately previous TAs to the duration threshold. As a still further example, the duration for each of the TAs is computed based on timestamps corresponding to the TAU requests transmitted by the UE 800, e.g., timestamps corresponding to receipt of the TAU requests transmitted when the UE 800 enters and leaves this TA.

The components 801-803 are illustrated as separate components in FIG. 8. However, this is merely to indicate that the functionality is separated. The components may be provided as separate elements. However, other arrangements are possible, e.g., some of them may be combined as one unit. Any combination of the components may be implemented in any combination of software, hardware, and/or firmware in any suitable location. For example, there may be more controllers configured separately, or just one controller for all of the components.

The components may constitute machine-executable instructions embodied within a machine, e.g., readable medium, which when executed by a machine will cause the machine to perform the operations described. Besides, any of the components may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some components may be omitted altogether. Functionality and cooperation of these components are correspondingly described with reference to FIG. 4.

Figure 9:
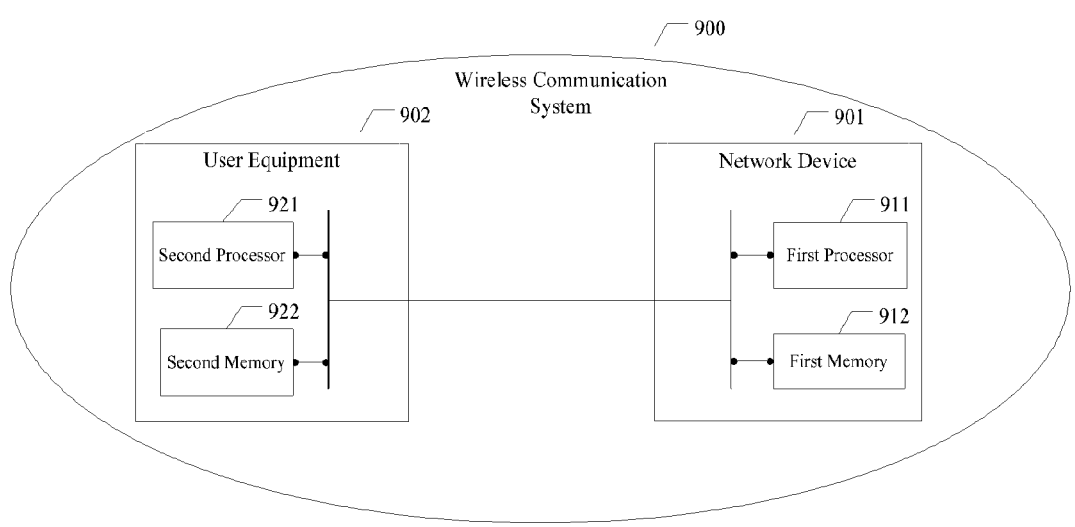
FIG. 9 is a block diagram illustrating a wireless communication system according to some embodiments of the present disclosure.

FIG. 9 is a block diagram illustrating a wireless communication system 900 for mobility management according to some embodiments of the present disclosure. The wireless communication system 900 comprises at least a network device 901 and a UE 902. In one embodiment, the network device 901 may act as the network device as depicted in FIG. 5 and comprise a first processor 911 and a first memory 912 which are corresponding to the processor 501 and the memory 502 respectively. In one embodiment, the UE 902 may act as the UE as depicted in FIG. 6 and comprise a second processor 921 and a second memory 922 which are corresponding to the processor 601 and the memory 602 respectively.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a network device for mobility management in a wireless communication network, the network device communicatively connected to at least a user equipment in the wireless communication network, the method comprising:
   determining whether the user equipment is in a fast-moving state upon receipt of a tracking area update request from the user equipment, the user equipment transmitting the tracking area update request when the user equipment enters a current tracking area having a current tracking area identity and leaves a previous tracking area, and determining whether the user equipment is in the fast-moving state further comprising:
   comparing a duration value associated with the user equipment to a predetermined threshold, the predetermined threshold based on a size of the tracking area, and for each of the previous tracking areas:
      obtaining a first timestamp when receiving a first tracking area update request from the user equipment;

obtaining a second timestamp when receiving a second tracking area update request from the user equipment; and the duration in which the user equipment stays in this previous tracking area being computed as a difference between the second timestamp and the first timestamp; and in response to the duration value being less than the threshold, determining that the user equipment is in the fast-moving state; and in response to the user equipment being in the fast-moving state:

configuring a tracking area identity list associated with the user equipment to include only the current tracking area identity of the current tracking area into which the user equipment has entered; and paging the user equipment using the tracking area identity list.

2. The method of claim 1, wherein the duration value is a duration in which the user equipment stays in the previous tracking area.

3. The method of claim 1, wherein the duration value is an average of durations in which the user equipment stays in each of a plurality of immediately previous tracking areas.

4. A method implemented by a user equipment for mobility management in a wireless communication network, the user equipment communicatively connected to at least a network device in the wireless communication network, the method comprising:

transmitting a tracking area update request to the network device when the user equipment enters a current tracking area having a current tracking area identity and leaves a previous tracking area, and for each of a plurality of previous tracking areas:

obtaining a first timestamp when receiving a first tracking area update request from the user equipment;

obtaining a second timestamp when receiving a second tracking area update request from the user equipment; and the duration in which the user equipment stays in this previous tracking area being computed as a difference between the second timestamp and the first timestamp;

receiving a tracking area identity list that is configured to include only the current tracking area identity of the current tracking area into which the user equipment has entered, in an accept message from the network device, the tracking area identity list being configured in response to determining that the user equipment is in a fast-moving state based on a comparison of an average of durations in which the user equipment stays in each of the plurality of immediately previous tracking areas to a predetermined threshold, the predetermined threshold based on a size of the tracking area; and receiving a paging message transmitted based on the tracking area identity list.

5. The method of claim 4, wherein the durations are computed based on timestamps corresponding to the tracking area update requests transmitted from the user equipment.

6. A user equipment for mobility management in a wireless communication network, the user equipment communicatively connected to at least a network device in the wireless communication network, and comprising:

a processor; and a memory communicatively coupled to the processor and adapted to store instructions which, when executed by the processor, cause the user equipment to perform operations of:

transmitting a tracking area update request to the network device when the user equipment enters a current tracking area having a current tracking area identity and leaves a previous tracking area having a previous tracking area identity, and for each of a plurality of previous tracking areas:

obtaining a first timestamp when receiving a first tracking area update request from the user equipment;

obtaining a second timestamp when receiving a second tracking area update request from the user equipment; and the duration in which the user equipment stays in this previous tracking area being computed as a difference between the second timestamp and the first timestamp;

receiving a tracking area identity list that is configured to include only the current tracking area identity of the current tracking area into which the user equipment has entered, in an accept message from the network device, the tracking area identity list being configured in response to determining that the user equipment is in a fast-moving state based on a comparison of an average of durations in which the user equipment stays in each of the plurality of immediately previous tracking areas to a predetermined threshold, the predetermined threshold based on a size of the tracking area; and receiving a paging message transmitted based on the tracking area identity list.

7. The user equipment of claim 6, wherein the durations are computed based on timestamps corresponding to the tracking area update requests transmitted from the user equipment.

* * * * *